(12) United States Patent
Barr

(10) Patent No.: US 9,883,658 B2
(45) Date of Patent: Feb. 6, 2018

(54) ELECTRO-MECHANICAL PEST DETERRENT FOR USE WITH ANY BIRD FEEDER

(71) Applicant: Douglas Barr, Cornish, ME (US)

(72) Inventor: Douglas Barr, Cornish, ME (US)

( * ) Notice: Subject to any disclaimer, the term of this patent is extended or adjusted under 35 U.S.C. 154(b) by 530 days.

(21) Appl. No.: 14/579,284

(22) Filed: Dec. 22, 2014

(65) Prior Publication Data

US 2015/0173329 A1 Jun. 25, 2015

Related U.S. Application Data

(60) Provisional application No. 61/918,688, filed on Dec. 20, 2013.

(51) Int. Cl.
*A01K 39/01* (2006.01)
*A01M 29/24* (2011.01)
*A01M 29/30* (2011.01)

(52) U.S. Cl.
CPC ......... *A01K 39/0113* (2013.01); *A01M 29/24* (2013.01); *A01M 29/30* (2013.01)

(58) Field of Classification Search
CPC ... A01K 39/0113; A01K 39/01; A01M 29/24; A01M 29/30; A01M 29/32
USPC ...... 119/57.9, 52.3, 57.8, 428, 429, 459, 63, 119/908
See application file for complete search history.

(56) References Cited

U.S. PATENT DOCUMENTS

| | | | |
|---|---|---|---|
| 2,856,898 A | 10/1956 | Doubleday | |
| 5,150,665 A * | 9/1992 | Boaz | A01K 39/0113 119/52.3 |
| 5,191,857 A | 5/1993 | Boaz | |
| 5,285,747 A | 2/1994 | Caldine | |
| 5,471,951 A | 12/1995 | Collins | |
| 5,937,788 A | 8/1999 | Boyd | |
| 6,065,427 A | 5/2000 | Peinetti | |
| 6,119,627 A * | 9/2000 | Banyas | A01K 39/0113 119/52.3 |
| 6,158,385 A * | 12/2000 | Boyd | A01K 39/0113 119/52.3 |
| 6,341,576 B1 * | 1/2002 | Cathell | A01K 39/0113 119/52.3 |
| 6,363,891 B1 * | 4/2002 | Marshall | A01K 39/0113 119/719 |
| 6,378,458 B1 | 4/2002 | Boyd | |
| 6,408,789 B1 | 6/2002 | Hsaio | |
| 6,561,128 B1 | 5/2003 | Carter | |

(Continued)

Primary Examiner — Trinh T Nguyen

(57) ABSTRACT

The embodiment is a compact electro-mechanical device to deter pests from accessing bird feeders. The device is placed above or below a bird feeder to deter pests by application of an electrical shock. The deterrent charge is non-injurious, and the physical discomfort ends when the pest departs from the device. Activation of the charge is automatic and immediate when a pest upsets the level rest position of the device, requiring neither human input for activation nor battery-consuming continuous electronic sensing in the device. Activation is omni-directional, protecting the bird feeder from pests approaching from any direction. The device is designed for installation directly between a feeder and its mount, permitting its use on any suspended or pole-mounted bird feeder with no modification to the feeder or to the device.

20 Claims, 10 Drawing Sheets

(56) References Cited

U.S. PATENT DOCUMENTS

| | | | |
|---|---|---|---|
| 6,619,229 B1* | 9/2003 | Lush | A01K 15/025 |
| | | | 119/52.3 |
| 7,171,921 B1* | 2/2007 | Lush | A01K 39/0113 |
| | | | 119/57.9 |
| 8,413,605 B2 | 4/2013 | Baynard | |
| 2006/0075112 A1* | 4/2006 | Polozoff | H04L 65/1066 |
| | | | 709/227 |
| 2013/0174789 A1* | 7/2013 | Koski | A01K 39/0113 |
| | | | 119/57.9 |

* cited by examiner

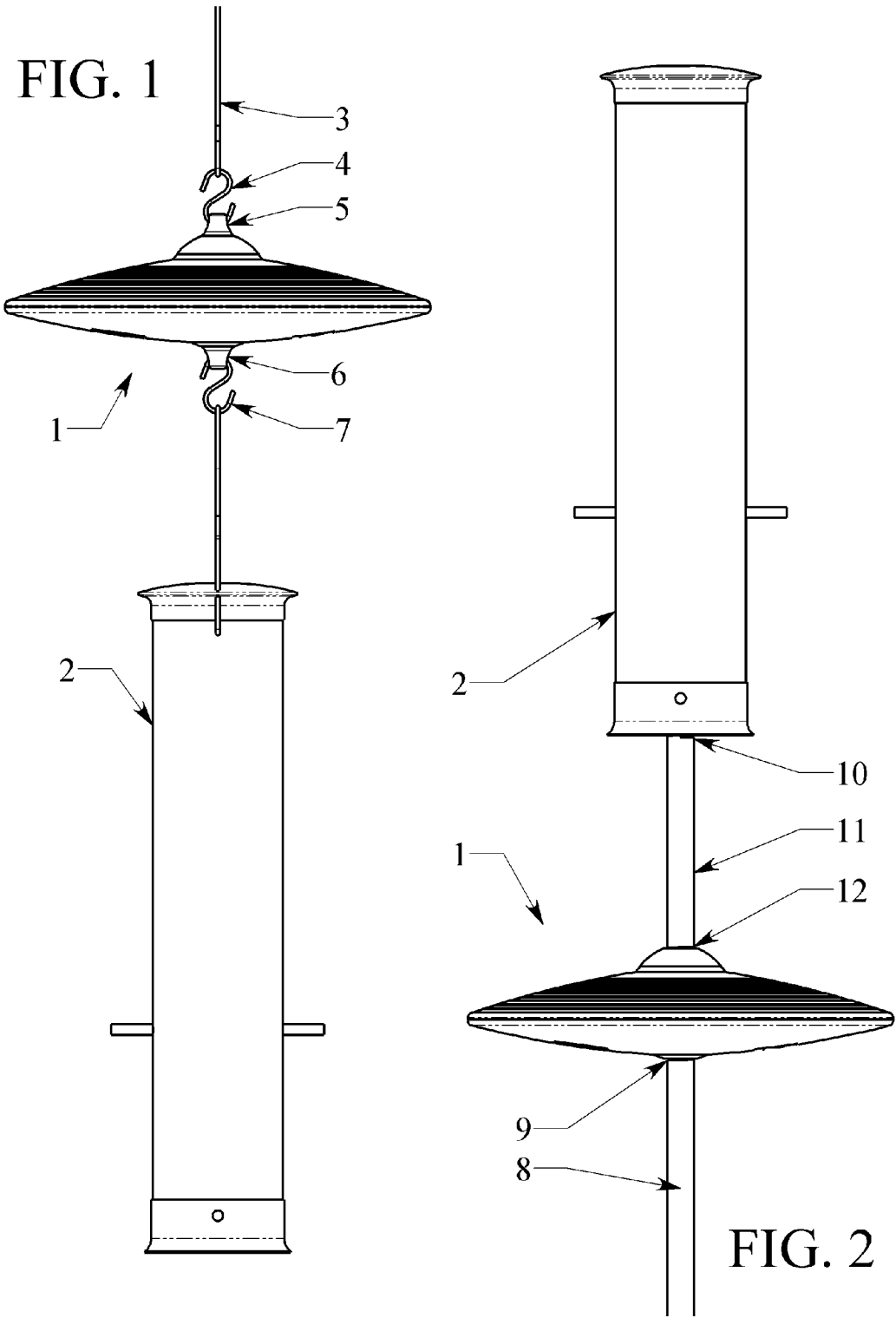

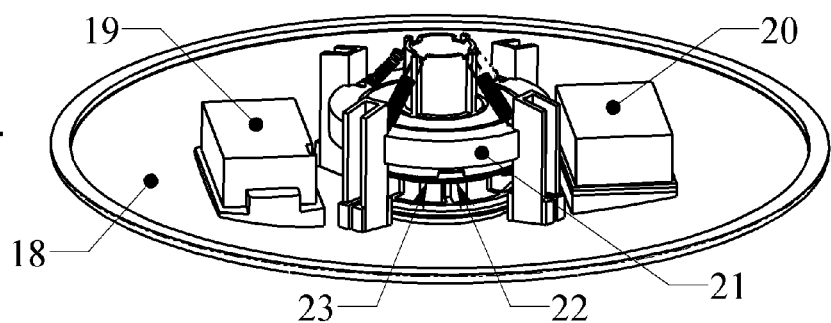
FIG. 4
FIG. 5
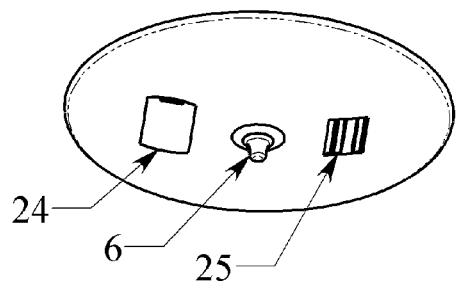
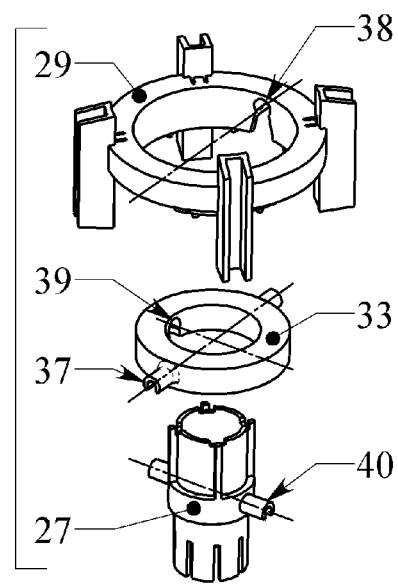
FIG. 7
FIG. 6
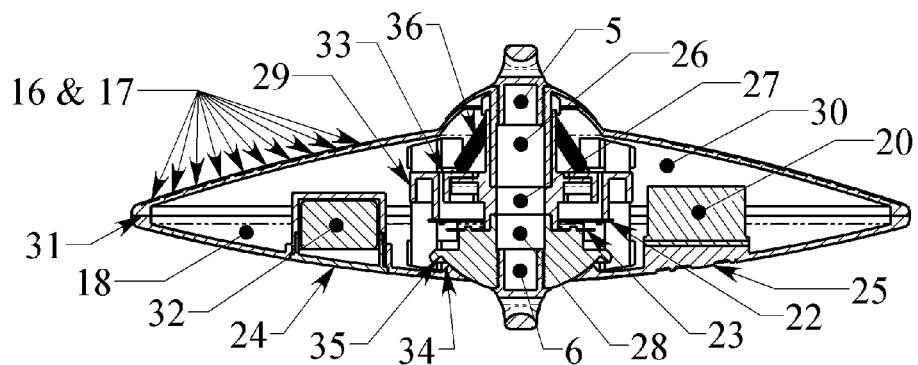

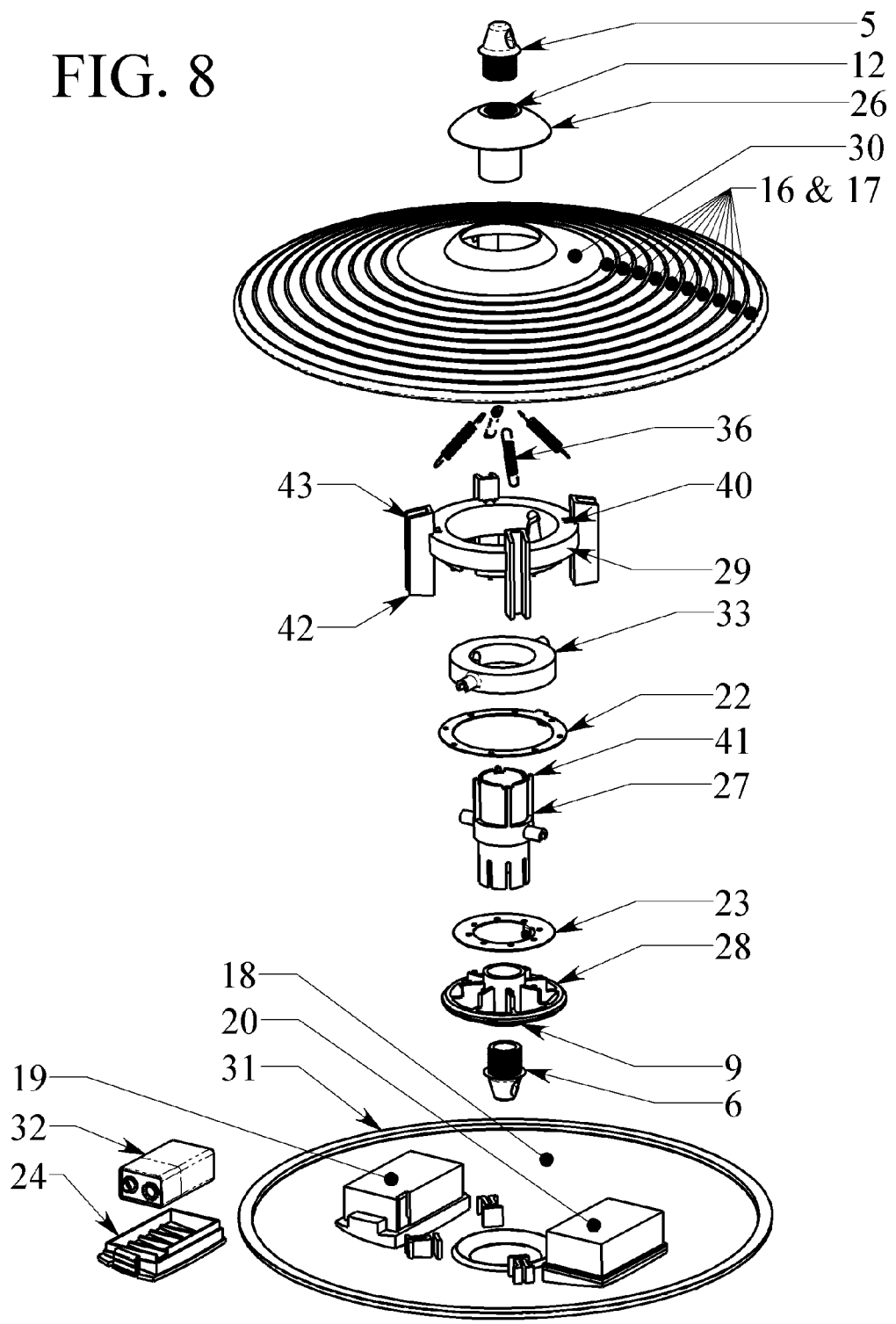

ELECTRO-MECHANICAL PEST DETERRENT FOR USE WITH ANY BIRD FEEDER

CROSS-REFERENCE TO RELATED APPLICATIONS

This patent application claims priority to and benefit of an earlier filing date from provisional patent application No. 61/918,688

FIELD OF THE DISCLOSURE

This disclosure relates to the field of bird feeders. More particularly, it relates to a device to deter squirrels and similar pests from accessing bird feeders.

BACKGROUND

Many inventions have been devised to deter access to birdfeeders by squirrels and other pests. Due to their persistent nature, pests such as squirrels will find a way to get around any obstruction, unless that obstruction causes physical discomfort to the pests. Electrical shock is an excellent deterrent to pests. Reliable delivery of that electrical shock is problematic. No device exists which provides consistent reliable protection for bird feeders.

SUMMARY

This disclosure describes a device whose purpose is to prevent pests from gaining access to bird feeders. This deterrent device is not itself a bird feeder, instead it is designed for use in conjunction with any existing bird feeder, with no modification required for either the device or the bird feeder. The device provides: protection from approach from all directions, unavoidable contact between pest and shocking conductors, reliable and long-lasting pest-presence sensing, and universal installation for every mounting configuration.

The device's deterrent method is a high voltage shock delivery system which is non-injurious yet extremely repellent to any pest that encounters it. The device is autonomous, requiring no activation by a human beyond its initial installation, and it requires no maintenance beyond occasional replacement of its long-life battery, which provides its high voltage output only when activated by the pest itself. There is no current flow whatsoever until the device's level rest position is disturbed by the presence of a pest, yet neither the lighter weight of a bird nor the force of the wind are sufficient to activate the device.

The embodiment comprises a housing, which is attached to an internal spherically-pivoting support mechanism. Also attached to the pivoting support is an omni-directional level sensor, whose function is to detect angular rotation of the system. Upon angular rotation of the housing, a voltage-amplifying electronic circuit is activated by said sensor. An electrical charge is delivered to a plurality of conductors, affixed to the exterior of the housing. One of said conductors forms a positive contact and another of said conductors forms a negative contact. When said positive and negative contacts are simultaneously engaged, an electrical shock will result. The housing also comprises a universal mounting system which permits multiple mounting configurations of said housing.

The device is placed between the feeder being protected and the route of access used by the pests. In its level rest position, the device is centrally balanced in alignment with the vertical axis of the mount, either suspended or pole-mounted. Confronted with the physical obstruction of the baffle in its path, the pest must bypass the device in order to reach the feeder. As it moves away from the central support, the off-center added weight of the pest induces the device to tilt from its level rest position, and the tilting causes closure of the normally-open activation switch, initiating the electronic circuit which generates and delivers a high voltage shock to the pest as it touches any two oppositely charged conductive elements among a plurality of said elements arrayed on the upper surface of the device. The pest escapes the shock by leaping off of the device. Now un-weighted, the device returns to its level rest position, its activation contacts once again open.

In one installation configuration, the device sits directly above a bird feeder, discouraging squirrel approach from above. With direct access to the feeder obstructed, the pest steps onto the device in its attempt to bypass it and reach the feeder below. In this configuration, the same suspension method used to hang the feeder is used to hang the device, and the feeder is suspended beneath the device. Installation is direct and easily performed by the owner with no more tools than those required to hang the bird feeder itself.

In another configuration, the device sits directly beneath the feeder, mounted on a pole. Its location obstructs access to the feeder, and the pest must reach upward to gain hold of the rim, in its attempt to bypass the device and reach the feeder above it. Mounting on the owner's existing pole is accomplished by screwing the threaded base of the device directly onto the threaded end of the existing mounting pole. A short extension pole is attached to the threaded hole atop the device, its uppermost threaded end inserting into the existing threaded base of the owner's bird feeder.

In yet another pole-mounted configuration, the device again sits beneath the feeder, with the owner's existing pole passing upward through the vertical central aperture of the device. A supporting collar positions the device at the desired height below the feeder, which sits atop the pole as it did without the device attached.

This device, as provided to the consumer, requires no adaptation of either the device or the owner's bird feeder, and may be installed easily by the owner using any of the several mounting configurations described above.

The above summary provides a basic understanding of some aspects of the specification. It is not intended to identify key or critical elements of the specification, nor to delegate any scope of particular embodiments of the specification or any scope of the claims.

DESCRIPTION OF THE DRAWINGS

FIG. 1 is an elevation view of the device in the hanging configuration, above a bird feeder.

FIG. 2 is an elevation view of the device in the pole-mounted configuration, under a bird feeder.

FIG. 4 is a perspective view of the device with the upper housing removed.

FIG. 5 is a perspective view of the underside of the device.

FIG. 6 is a section view of the hanging configuration of the device showing major components.

FIG. 7 is an exploded perspective view of the pivot mechanism.

FIG. 8 is an exploded perspective view of the device showing internal and external components.

DETAILED DESCRIPTION

Figure 3:
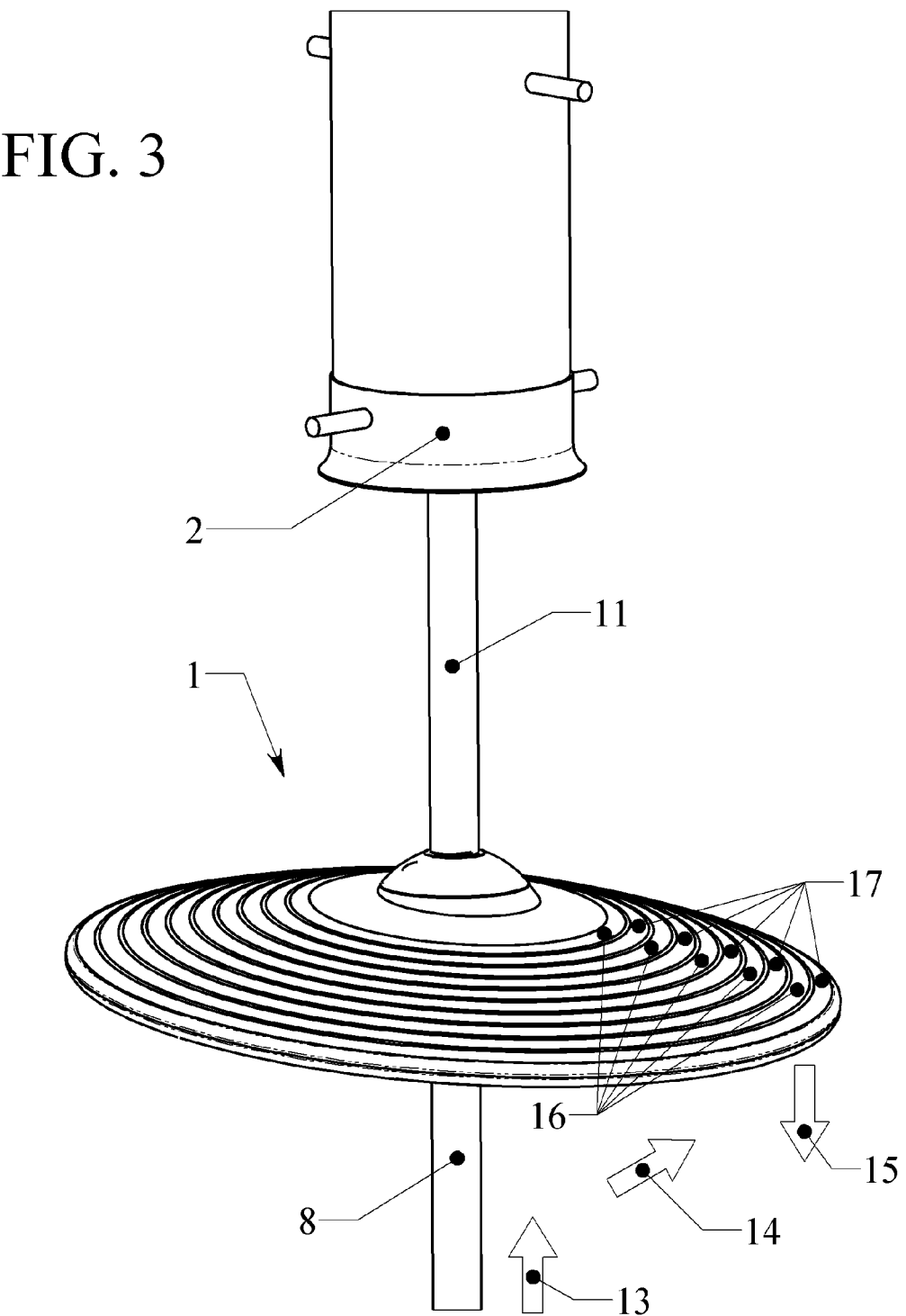
FIG. 3 is a perspective view of the device in the pole-mounted configuration, in tilted position.

Referring to FIG. 1, this view depicts the device in its hanging configuration, in which the device is positioned above the bird feeder. The same suspension method previously used to support the bird feeder is now used to support the device, which in turn supports the feeder. The device 1 hangs from suspension apparatus 3 (wire, chain, rope or similar), which may include optional s-hook 4 or similar, which connects to the eyelet of the device's hanging adapter 5, affixed to the upper housing of the device. A similar hanging adapter 6 is affixed to the under side of the device, into which is connected a second s-hook 7 which supports the bird feeder 2 beneath the device.

Referring to FIG. 2, the device is shown here in its pole-mounted configuration. The device 1 is attached to the existing ground-mounted support pole 8 by engaging the device's threaded aperture 9 in its lower housing with the threaded upper end of the mounting pole. On the top of the upper housing of the device, a second threaded aperture 12 accepts the threaded lower end of extension pole 11, which in turn acts as the support for the bird feeder 2, which is screwed down onto the threaded upper end 10 of the extension pole.

Referring to FIG. 3, this view shows the device 1 in its pole-mounted configuration mounted on the base pole 8, situated above said pole and beneath the bird feeder 2 and extension pole 11. In this configuration the pest would ascend the mounting pole 13, attempt to climb onto the device 14, pulling the rim of the device downward 15, engaging internal circuit activation contacts. When the pest gains hold of the rim and attempts to proceed upward toward the feeder, contact with the positive and negative charge conductors 16 and 17 is unavoidable. The pest receives a substantial but non-injurious electrical shock, which continues until the pest leaps from the device. This view shows a plurality of alternating positive and negative conductors affixed to the top surface of the device, affording the pest no grasping surfaces free of shocking conductors.

Referring to FIG. 4, the device is shown with its upper housing removed, enabling identification of internal components. The lower housing 18 supports the battery case 19, the charge generating circuitry 20, the omni-directional pivot mechanism 21, and the activation contacts 22 & 23.

Referring to FIG. 5, the underside of the device is depicted, showing the lower hanging adapter 6, the battery access cover 24, and the combination Power On/Charge Enable actuator 25.

Referring to FIG. 6, this section view again shows the internal components of the device. Starting with the components which are essentially 'fixed' relative to the vertical axis of the mount: the upper hanging adapter 5 which is affixed to the upper center tube 26 which in turn is affixed to the inner gimbal ring 27. Said gimbal ring is in turn affixed to lower center tube 28, to which is affixed the lower hanging adapter 6. Affixed to the lower center tube 28 is the inner activation contact ring 23. Turning now to the relatively 'floating' components: the lower housing 18 is affixed to the outer gimbal ring 29, which in turn is affixed to the upper housing 30. Upper and lower housings, thus joined, are also connected at their perimeter junction 31 as well. Affixed to the circular lower surface of said outer gimbal ring 29 is the outer activation contact ring 22. Affixed to the upper surface of said upper housing 30 are a plurality of conductor elements 16 & 17. Also supported within said lower housing are the battery 32 and its cover 24, as well as the charge generator circuitry 20 with power/enable switch 25. These two relatively 'fixed' and relatively 'floating' component subassemblies are joined together in a free-floating dual-axis connection by attachment of both to gimbal ring 33. The omni-directional floating motion is restricted angularly by stop feature 34 on lower housing 18, and stop feature 35 on lower center tube 28. Due to the center of gravity of the 'floating' subassembly being below the center of rotation of the pivot mechanism, the 'floating' subassembly will settle to a balanced center position when there is no eccentric force applied to the 'floating' subassembly. To accelerate return to this central position, a plurality of coil springs 36 are installed between the 'fixed' and 'floating' subassemblies.

Referring to FIG. 7, we see only the three gimbal components identified in the previous drawing, disassembled for clarification. Gimbal ring 33 has a pair of axially-aligned male pivot features 37 extending outward on the outer perimeter, which pivot features align and cooperate with a pair of axially-aligned female pivot features 38 on the outer gimbal ring 29. Cooperating male and female features 37 and 38 are free to move in an axially-rotating virtually frictionless motion. In the same horizontal plane, and perpendicular to the axis of the male pivot features 37 of gimbal ring, said gimbal ring 33 has a second pair of axially-aligned female pivot features 39 on its inner perimeter, which features align and cooperate axially with a pair of axially-aligned male pivot features 40 extending outward from inner gimbal ring 27. The perpendicular dual axes of the axially-mated male/female pivot features afford unrestricted spherical rotation of the outer pivot ring 29 about the inner gimbal ring 27.

Referring to FIG. 8, the preferred embodiment of the device is depicted here in an exploded view, indicating a suggested order of assembly, and suggested assembly methods which may be utilized to assemble the components therein. These suggestions represent only one method, and are not intended to limit the manufacturing methods to be employed. Conductive elements 16 & 17 on upper housing 30 are installed, with wiring connectors leading from said conductors extending downward through the upper housing to the interior of the housing. Said conductive elements are not limited to any one type; the conductors may be composed of any of the following: a plurality of surface-mounted wires, surface-mounted sheet metal rings, insert-molded metal rings or wires, metallic surfaces integrated into the molded housing by means of electro-plating, printed-circuit boards or membrane circuits, or similarly conductive elements, using materials and methods employed by those skilled in the art. Additionally, it is not the intention of this disclosure to limit the conductor arrangement to only the concentric circular array shown in the preferred embodiment. An alternate conductor array, such as a radial arrangement, or another geometric pattern may be employed, as may a continuous spiraling pair of adjacent side-by-side conductors. The goal of the conductor arrangement is to broadly distribute the oppositely charged conductors across the upper surface of the device's upper housing, and to situate the oppositely charged conductor elements in a manner that leaves practically no non-conductive surface area between the conductors. With said conductors installed on the upper housing, gimbal ring 33 is installed upwardly into the outer gimbal ring 29, its mating pivot features snapping together. Inner gimbal ring 27 is likewise upwardly installed into gimbal ring 33. Outer activation contact ring 22 is affixed to underside of outer gimbal ring 29 by mechanical attachment methods such as heat staking, swaging, ultrasonic welding, or threaded hardware. Employing a similar assembly method, inner activation contact ring 23 is installed on upper surface of lower center tube 28. Lower center tube is then installed onto inner gimbal ring 27. Extension coil springs 36 are installed, one spring end attaching to hook retention feature 40 on outer gimbal ring, the other spring end attaching to hook retention feature 41 on inner gimbal ring. Gimbal subassembly (see FIG. 9 for illustration of completed assembly) is now installed into the device, with assembly features 42 of outer gimbal ring 29 engaging with mating features of lower housing 18. Charge generating circuitry 20 is installed on lower housing, and wiring connections are made between charge generator circuitry, outer 22 and inner 23 activation contact rings, battery connector, and wiring leading to conductive elements 16 & 17 on upper housing 30. Upper housing is installed onto assembly features 43 of outer gimbal ring 29, and onto assembly features on the perimeter 31 of the lower housing 18. Upper center tube 26 is installed downwardly through the upper housing to engage with the inner gimbal ring 27, and the battery 32 with cover 24 are installed in the battery case 19 on the underside of the lower housing. The device assembly is now complete. For installation using the hanging configuration, the upper hanging adapter 5 is installed in threaded aperture 12 of the upper center tube 26, and the lower hanging mount 6 is installed in the threaded aperture 9 of the lower center tube 28. For pole mounting configurations, these two adapter components are not used.

Figure 9:
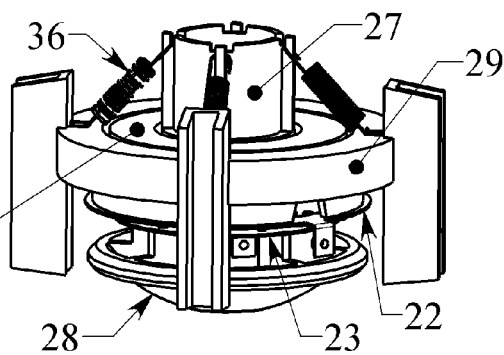
FIG. 9 is a perspective view of the omni-directional pivot/sensor mechanism.

Referring to FIG. 9, this perspective view of the assembled omni-directional pivot mechanism points out the relatively 'fixed' components: the inner gimbal ring 27, lower center tube 28, and inner activation contact ring 23; the relatively 'floating' components are: the outer gimbal ring 29 and the outer activation contact ring 22. These two subassembly components are joined in a freely moving rotational connection by gimbal ring 33. The plurality of coil springs 36, arrayed uniformly about the gimbal components, return the mechanism to the centered rest position shown.

Figure 10:
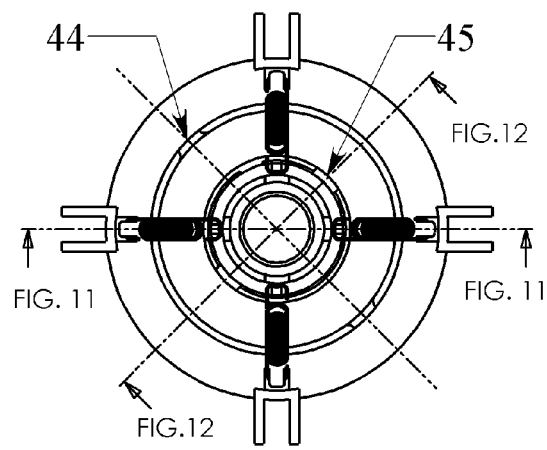
FIG. 10 is a top view of the pivot mechanism.

Referring to FIG. 10, this plan view of the pivot mechanism shows the two perpendicular pivot axes, indicated by lines 44 & 45. The following section views are projected from this view.

Figure 11:
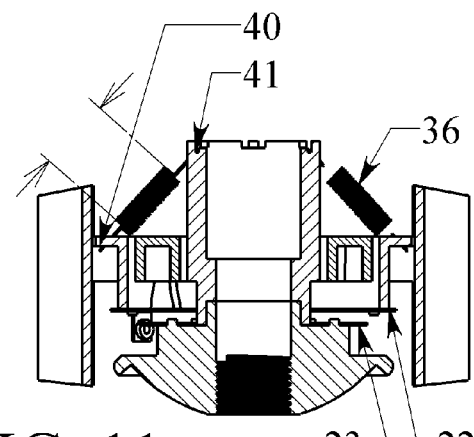
FIG. 11 is a front section view of the pivot mechanism in level rest position.

Referring to FIG. 11, this section view shows the pivot mechanism if cut through the support posts and the return springs. 40 & 41 are the attachment points of the hooked extension springs 36, which apply a pull force, indicated by the force arrows, which force resists against rotational forces applied to the relatively 'floating' part of the device. In this centered position, the activation contact rings 22 & 23 are uniformly separated from each other on all sides, maintaining the circuit in its normally open state.

Figure 12:
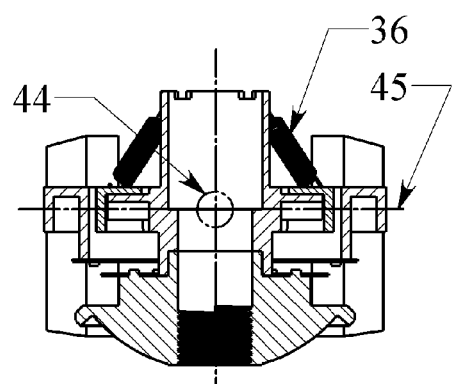
FIG. 12 is a section view of the pivot mechanism sectioned through one pivot axis, in level rest position.

Referring to FIG. 12, this section view shows the pivot mechanism if cut through rotational axis 45 of FIG. 10. That rotational axis 45 is co-planar and perpendicular to pivot axis 44, indicated in this view by a circle. Together, the two perpendicular axes provide complete freedom for the floating components to rotate spherically, unrestricted in any direction. In a similar fashion, the uniformly-spaced plurality of return springs 36 act together to re-center any rotation imparted to the mechanism.

Figure 13:
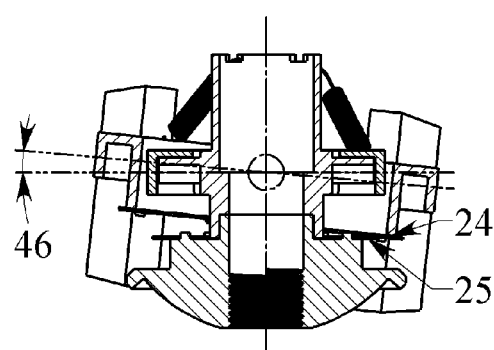
FIG. 13 is a section view of the pivot mechanism sectioned through one pivot axis, in tilted position.

Referring to FIG. 13, this section view again shows the pivot mechanism if cut through axis 45 of FIG. 10. But in this view, the floating components have been tilted about rotational axis 44 by a sufficient angular degree 46 to make contact between activation contact rings 22 & 23.

Figure 14:
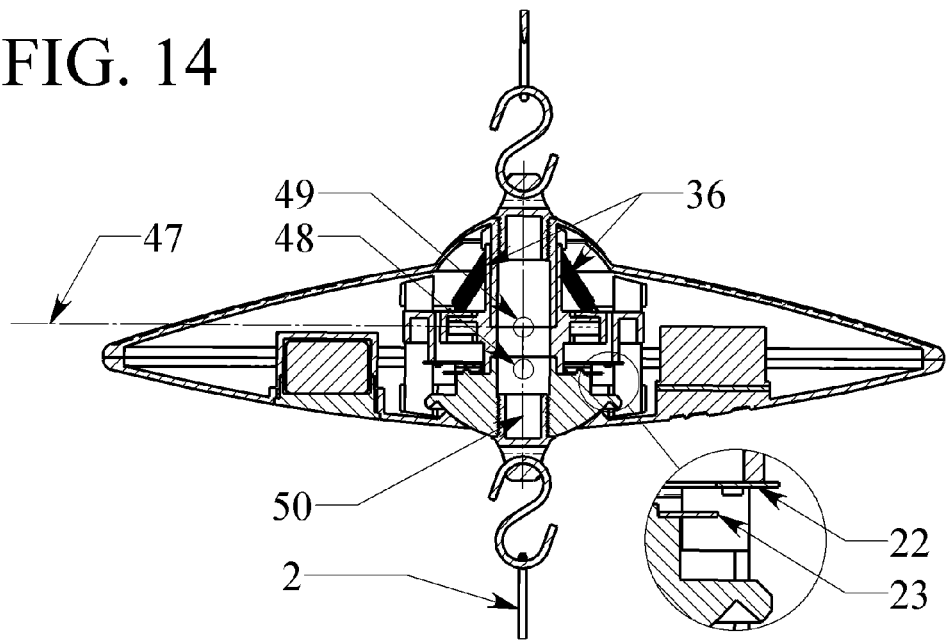
FIG. 14 is a section view of the device in the hanging configuration in level rest position.

Referring to FIG. 14, this section view shows the hanging configuration of the device, in its level rest position 47. In this orientation the activation switch contacts 22 and 23 are in their normally open position. The device naturally settles to this level position due to the center of gravity 48 of the device lying directly below the pivot center 49, both of which lie on the central vertical axis 50 which the device and the suspended bird feeder 2 are both aligned with. To assist in the return to the level rest position, extension springs 36 are attached at either end to the relatively 'floating' and the relatively 'fixed' components of the device.

Figure 15:
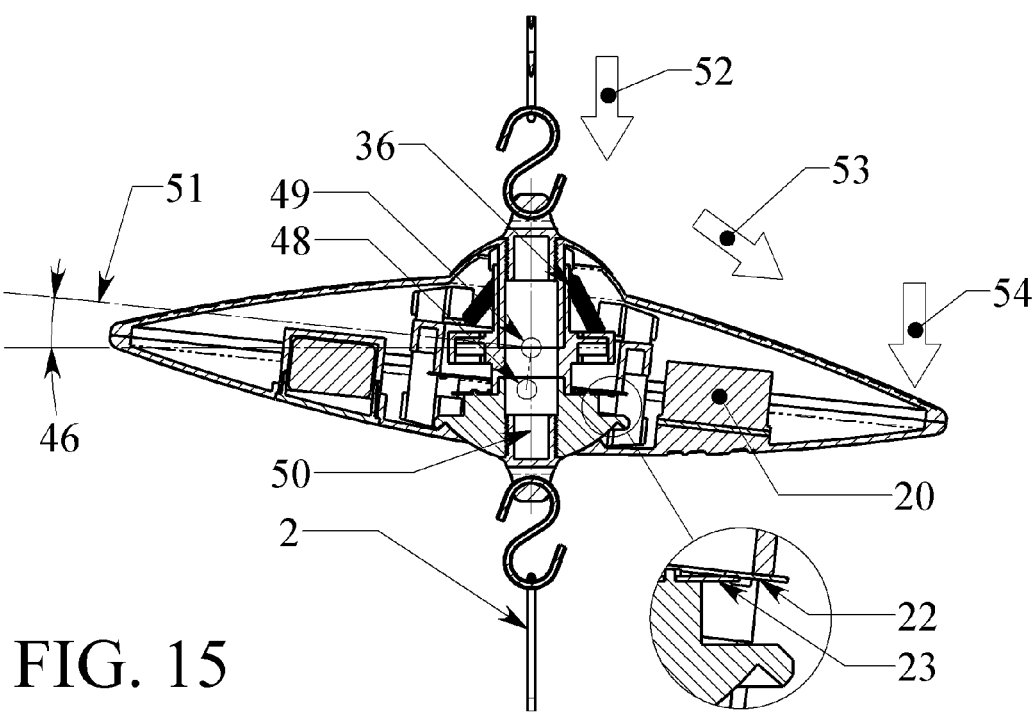
FIG. 15 is a section view of the device in the hanging configuration in tilted position.

Referring to FIG. 15, this section view also shows the hanging configuration of the device, now in its tilted position 51. When the pest descends the suspension apparatus above the device 52 and proceeds 53 toward the outer rim 54, the device tilts downward, closing activation contacts 22 and 23. This closure initiates the charge generator circuit 20. The activation switch remains closed and the circuit will continue to generate the high voltage charge as long as the weight of the pest 54 induces tilting of the device. While the pivot center 49 of the device and the suspended bird feeder 2 are both aligned with the vertical axis 50, the center of gravity 48 of the device is now offset from the vertical axis by an angular degree equal to the tilt 46 of the device. While tilted, the extension springs 36 on the relatively downward tilted side of the device are extended, exerting a return force which, together with the downward force of gravity, returns the device to a level centered orientation after the pest departs the device.

Figure 16:
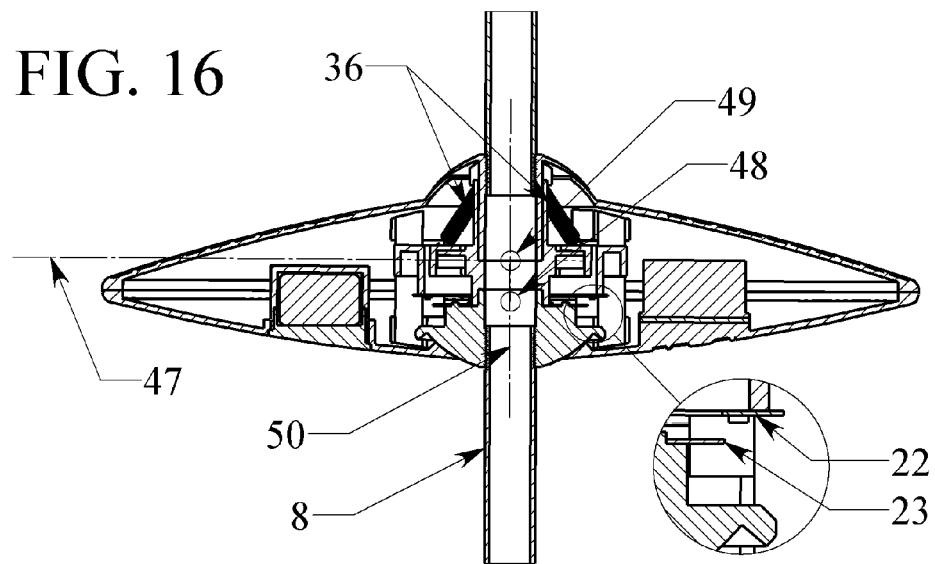
FIG. 16 is a section view of the device in the pole-mounted configuration in level rest position.

Referring to FIG. 16, this is a section view of the device in pole-mounted configuration, shown in its level rest position 47. In this orientation the activation switch contacts 22 and 23 are in their normally open position. The device naturally settles in this level position due to the center of gravity 48 of the device lying directly below the pivot center 49, both of which lie on the central vertical axis 50 which the device and the mounting pole 8 are aligned with. To assist in the return to this rest position, extension springs 36 are attached at either end to the relatively 'floating' and the relatively 'fixed' components of the device.

Figure 17:
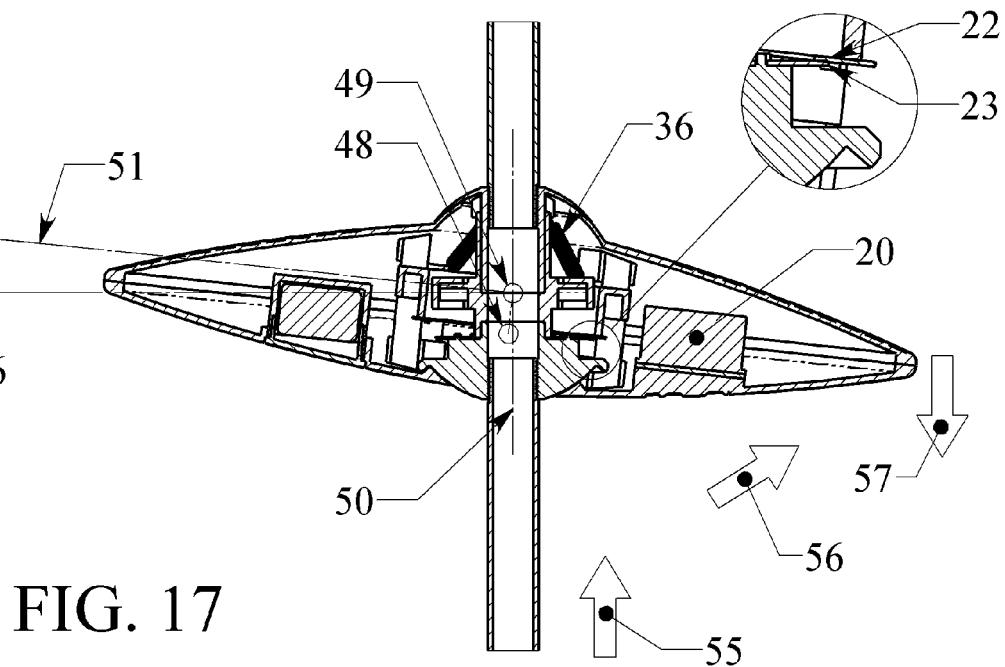
FIG. 17 is a section view of the device in the pole-mounted configuration in tilted position.

Referring to FIG. 17, this section view also shows the pole-mounted device, now in its tilted position 51. When the pest ascends the mounting pole below the device 55 and reaches for the outer rim 56 the device is pulled downward 57, closing activation contacts 22 and 23, initiating the charge generator circuit 20. The activation switch remains closed and the circuit will continue to generate the high voltage charge as long as the weight of the pest 57 induces tilting of the device. While the pivot center 49 of the device remains aligned with the mounting pole in the vertical axis 50, the center of gravity 48 of the device is now offset from the vertical axis an angular degree equal to the tilt of the device 46. While tilted, the extension springs 36 on the relatively downward tilted side of the device are extended, exerting a return force which, together with the downward force of gravity, returns the device to a level centered orientation after the pest departs the device.

Figure 18:
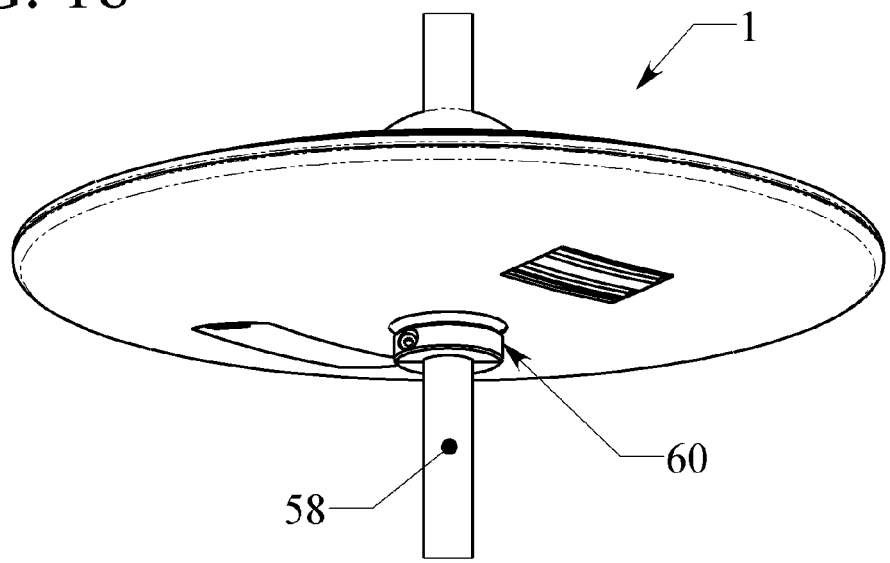
FIG. 18 is a perspective view of the underside of the device in the through-pole mounting configuration.
Figure 19:
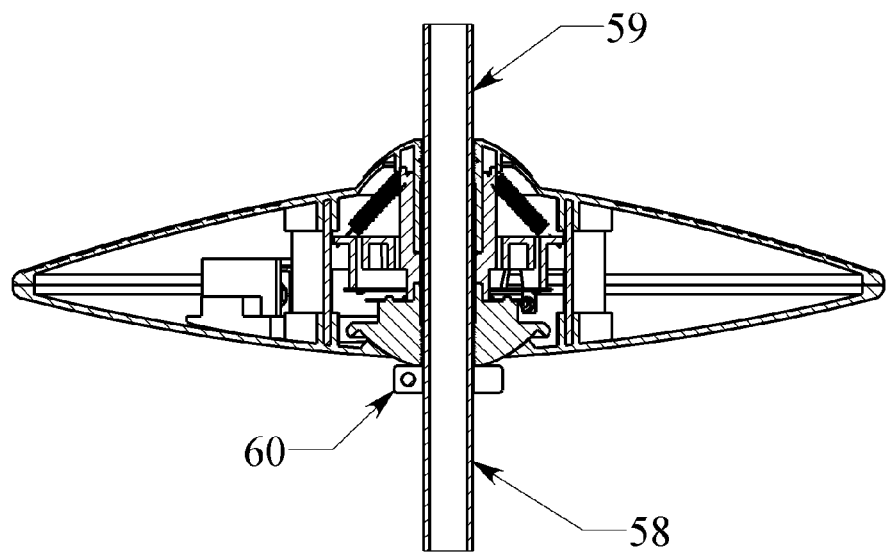
FIG. 19 is a section view of the device in the through-pole mounting configuration.

Referring to FIGS. 18 & 19, these views depict the device 1 in the through-pole mounting configuration. The mounting pole 58 passes directly through the center of the device, extending upward 59 for mounting of the bird feeder on top of the pole, which is installed using the same mounting method used prior to installation of the device on the pole. A clamping collar 60, securely affixed to the pole under the device, provides support for the device at any desired height.

Figure 20:
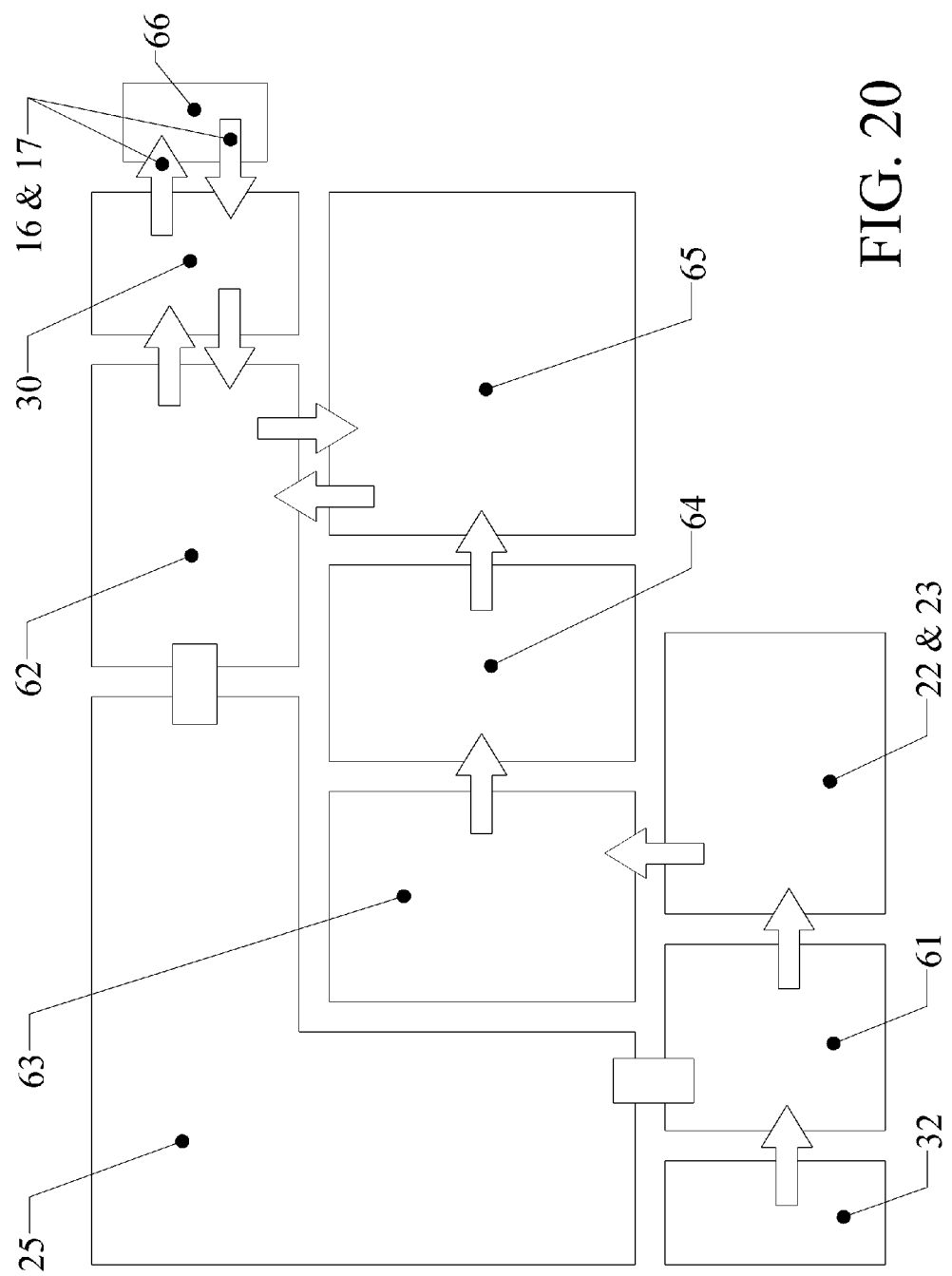
FIG. 20 is a functional schematic diagram of the charge generator circuitry.
Figure 21:
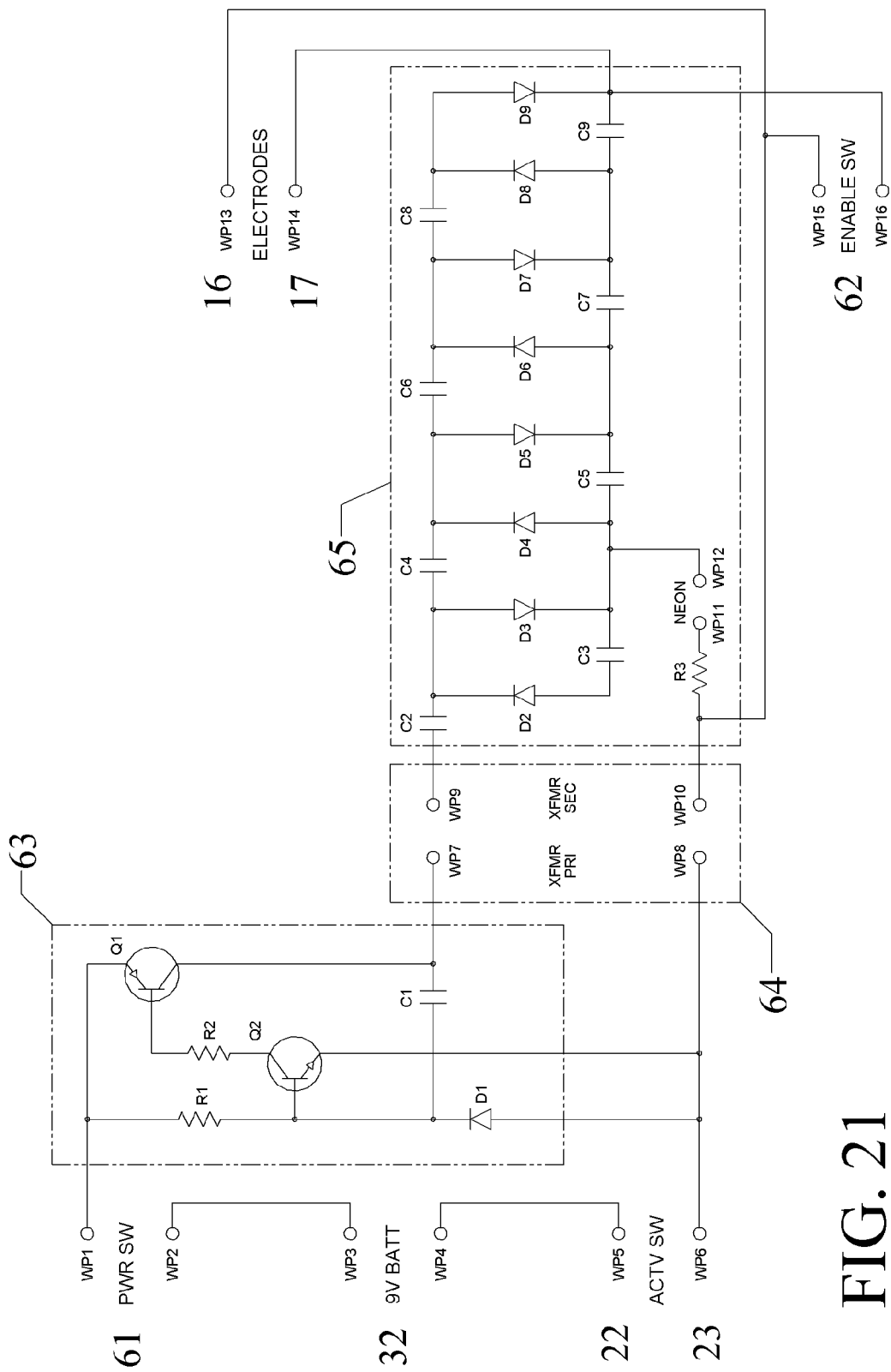
FIG. 21 is an electrical schematic diagram of the charge generator circuitry.

Referring to FIG. 20, a functional schematic diagram, and FIG. 21, an electrical schematic diagram, both illustrating the charge generator circuitry. In preparation for use, the Power On/Charge Enable actuator 25 is moved to the On/Enable position. This simultaneously performs two functions: it closes an electro-mechanical switch 61 connecting battery 32 to the normally-open activation contact switch 22 & 23; and it closes an electro-mechanical switch 62 enabling the high voltage output charge to travel to the conductive elements on the exterior of the device, once said charge has been activated by the presence of a pest. In the presence of a pest and the associated tilting of the device, activation contact switch 22 & 23 closes, permitting battery current to flow to the charge generating circuitry 63, consisting of a two-transistor tone oscillator. This pulsing circuit repeatedly passes a low voltage current pulse to the primary side of step-up transformer 64. The output of the secondary side of the transformer is amplified by a half-wave series voltage multiplier 65, increasing on a scale of greater than a hundred to one. The voltage multiplier rectifies the current and accumulates a significant charge almost instantaneously. With the high voltage conductor path to conductor elements enabled by switch 62, this amplified charge is passed directly to the conductive elements 16 & 17 on the exterior of the upper housing 32, and the charge then passes through the body of the pest 66, which is in direct contact with both poles of the conductive circuit. Upon the immediate departure of the pest, the device returns to its level position and the circuit returns to its normally open status, and the circuit ceases generation of its high voltage output. In preparation for maintenance such as battery changing, or for removal of the device from its mount, the Power On/Charge Enable actuator 25 is moved to the Off/Disable position. This action simultaneously opens the circuit which connects the battery to the activation contact switch; and it opens the circuit leading from capacitor storage to the conductor elements on the exterior of the device, rendering them free of high voltage charge, now safe to touch.

What is claimed is:

1. A deterrent device for restricting pest access to bird feeders, comprising:
    a housing;
    a spherically-pivoting support mechanism within said housing;
    an omni-directional level sensor, activated by angular rotation of the system, attached to said support mechanism;
    a voltage-amplifying electronic circuit activated by said sensor;
    a plurality of charge-delivery conductors connected to said circuit, affixed to said housing, whereby one of said conductors forms a positive contact and the other of said conductors forms a negative contact, so that an electrical shock will result when said positive and negative contacts are simultaneously engaged; and
    a universal mounting system permitting multiple mounting configurations of said housing.

2. The apparatus as in claim 1, in which the pivot mechanism is centrally balanced by means of the force of gravity plus the force of a plurality of coil springs.

3. The apparatus as in claim 1, in which the pivot mechanism is a bi-axial gimbal.

4. The apparatus as in claim 1, in which the pivot mechanism is a ball and socket.

5. The apparatus as in claim 1, in which the level sensor is an electro-mechanical switch.

6. The apparatus as in claim 1, in which the level sensor is a solid-state switch.

7. The apparatus as in claim 1, in which the said charge-delivery conductors are composed of a plurality of conductive elements arranged in a generally concentric pattern.

8. The apparatus as in claim 1, in which the said charge-delivery conductors are composed of a plurality of conductive elements arranged in a generally radial pattern.

9. The apparatus as in claim 1, in which the housing is positioned below a bird feeder.

10. The apparatus as in claim 1, in which the housing is positioned above a bird feeder.

11. An animal control device for deterring pests by delivery of an electrical shock, comprising:
    a housing;
    a spherically-pivoting support mechanism within said housing;
    an omni-directional level sensor, activated by angular rotation of the system, attached to said support mechanism;
    a voltage-amplifying electronic circuit activated by said sensor;
    a plurality of charge-delivery conductors connected to said circuit, affixed to said housing, whereby one of said conductors forms a positive contact and the other of said conductors forms a negative contact, so that an electrical shock will result when said positive and negative contacts are simultaneously engaged; and
    a universal mounting system permitting multiple mounting configurations of said housing.

12. The apparatus as in claim 11, in which the pivot mechanism is centrally balanced by means of the force of gravity plus the force of a plurality of coil springs.

13. The apparatus as in claim 11, in which the pivot mechanism is a bi-axial gimbal.

14. The apparatus as in claim 11, in which the pivot mechanism is a ball and socket.

15. The apparatus as in claim 11, in which the level sensor is an electro-mechanical switch.

16. The apparatus as in claim 11, in which the level sensor is a solid-state switch.

17. The apparatus as in claim 11, in which the said charge-delivery conductors are composed of a plurality of conductive elements arranged in a generally concentric pattern.

18. The apparatus as in claim 11, in which the said charge-delivery conductors are composed of a plurality of conductive elements arranged in a generally radial pattern.

19. The apparatus as in claim 11, in which the housing is positioned below a bird feeder.

20. The apparatus as in claim 11, in which the housing is positioned above a bird feeder.

\* \* \* \* \*